United States Patent [19]

Johnson

[11] 4,438,841

[45] Mar. 27, 1984

[54] OBSTRUCTION CLEARING APPARATUS FOR MINING CONVEYORS

[76] Inventor: Gregory Johnson, P.O. Box 166, Virgie, Ky. 41572

[21] Appl. No.: 280,268

[22] Filed: Jul. 6, 1981

[51] Int. Cl.³ .............................................. B65G 43/00
[52] U.S. Cl. ................................................... 198/524
[58] Field of Search ............... 198/524, 572, 468, 614, 198/560, 525, 372, 573, 836, 444, 460, 718, 746, 748; 209/625, 539

[56] References Cited

U.S. PATENT DOCUMENTS

| | | | |
|---|---|---|---|
| 1,259,524 | 3/1918 | Kelly | 198/573 |
| 1,570,604 | 1/1926 | Aram | 198/524 |
| 2,298,472 | 10/1942 | Dudley | 198/836 |
| 2,589,220 | 3/1952 | Buckeridge | 198/573 |
| 2,934,221 | 4/1960 | Tonna | 198/560 |
| 3,524,531 | 8/1970 | Georg | 198/560 |
| 3,625,357 | 12/1971 | Ochs et al. | 209/625 |
| 4,190,147 | 2/1980 | Hansson | 198/746 |

*Primary Examiner*—Joseph E. Valenza
*Assistant Examiner*—Jonathan D. Holmes
*Attorney, Agent, or Firm*—Frost & Jacobs

[57] ABSTRACT

A conveyor system for use in coal mines and the like for automatically sensing by means of a gob switch positioned above the conveyor belt when a build-up of coal occurs because of an obstruction on the belt, and automatically activating a reciprocable operable ram which pushes the obstacle from the conveyor belt. The ram is electrically operated by means of a drive chain and includes a reversing switch for reversing the direction of ram movement at the point of furthest ram extension. The obstruction removing apparatus may be positioned to push the obstruction in a direction parallel to or transversely of the direction of movement of the second belt.

24 Claims, 7 Drawing Figures

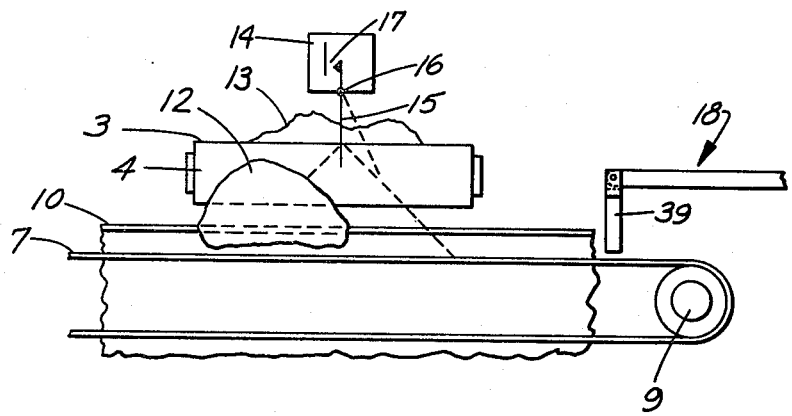
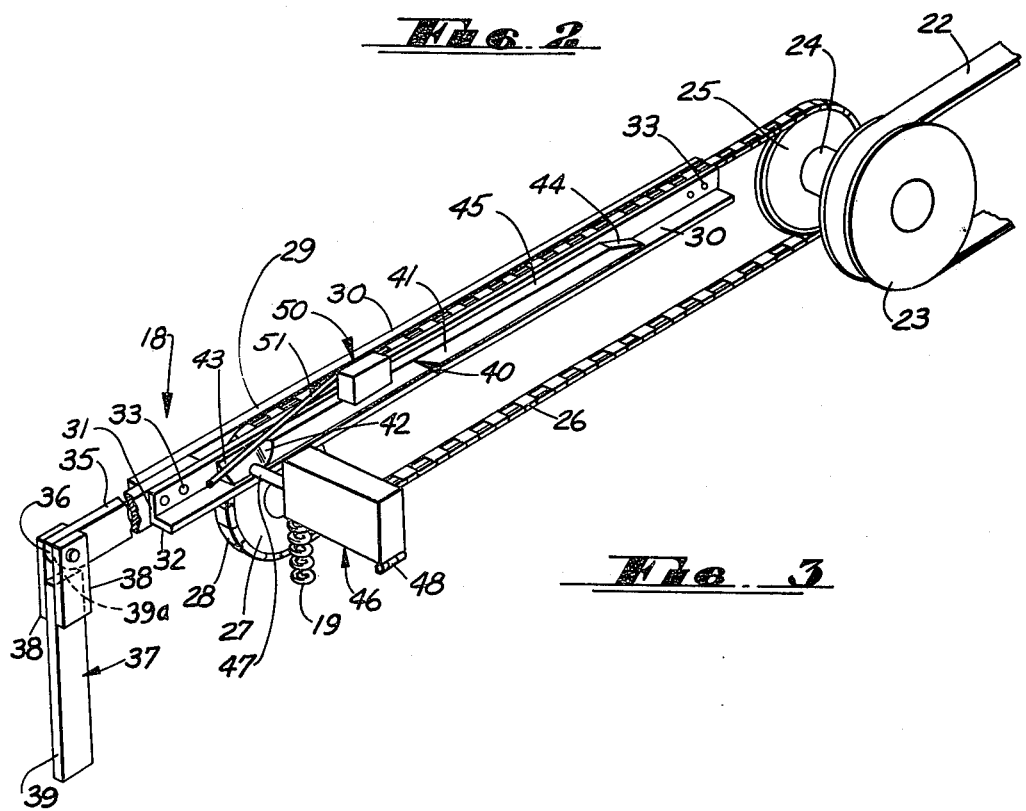

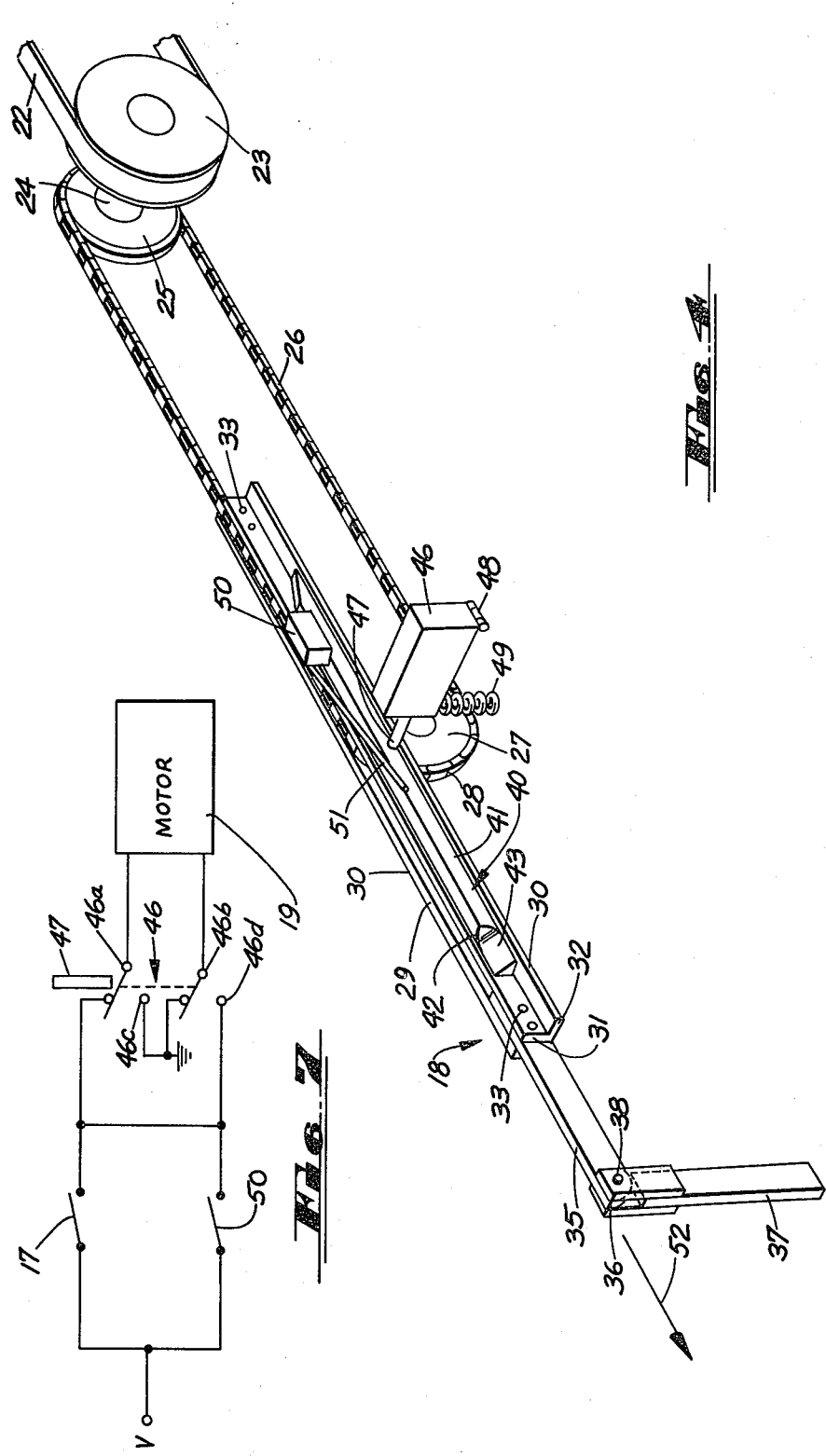

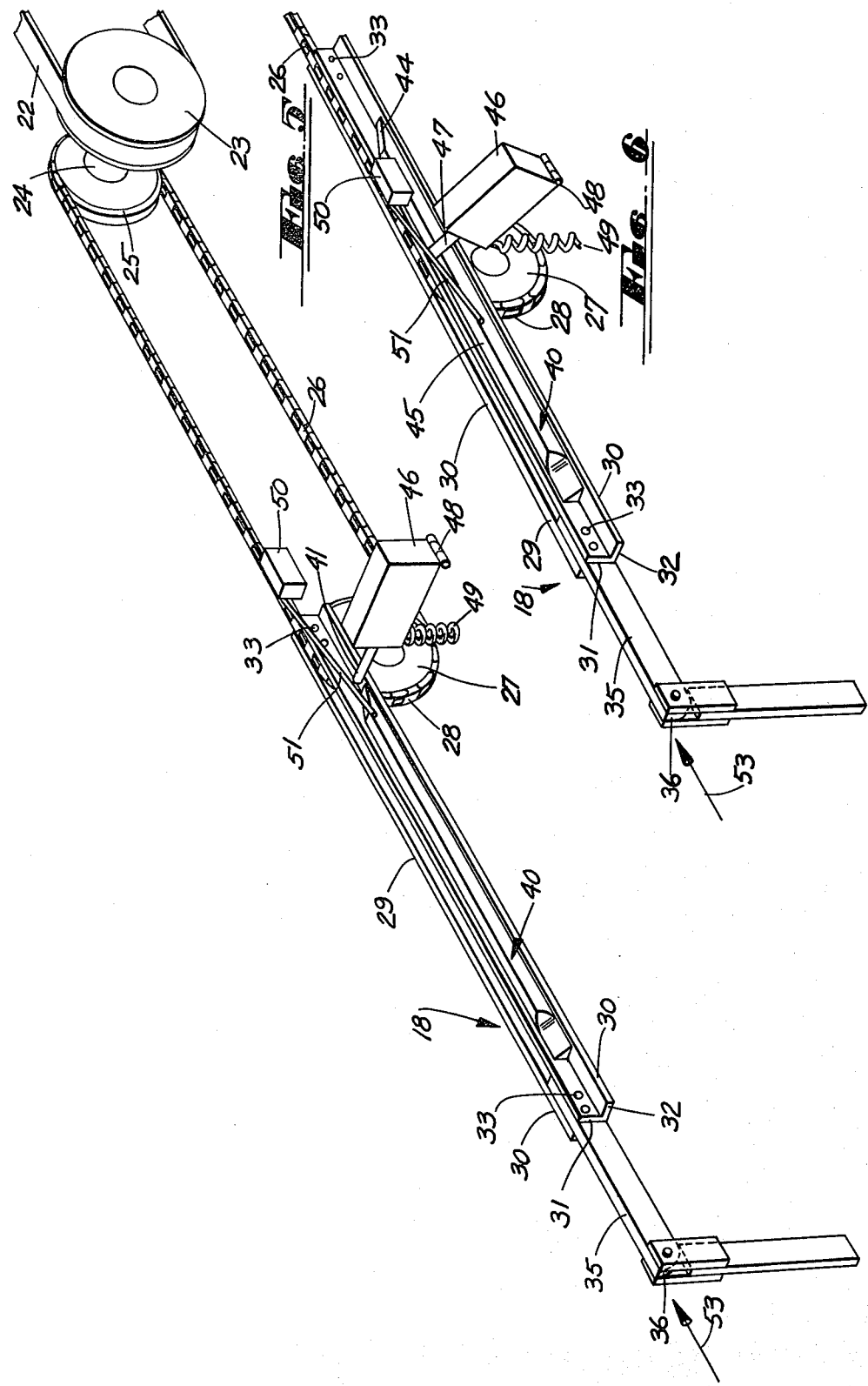

OBSTRUCTION CLEARING APPARATUS FOR MINING CONVEYORS

SUMMARY OF THE INVENTION

In many underground coal mining operations a continuous belt conveyor system is used to move the mined coal and other mined material from the working face through the mine shafts to a location outside of the mine where it may be removed for further processing. Where mining operations are extensive, it is not unusual for the conveyor system to extend several thousand feet in length. In addition, it is often necessary for the conveyor system to negotiate right angle bends as the lesser mine corridors connect with main corridors. Changes in direction of the conveyor system are accomplished by means of separate endless belt conveyors arranged at right angles and vertically displaced with respect to each other so as to permit the mined material to be spilled onto the upper surface of the lower belt.

At the point of intersection of the two conveyors a restriction plate is often used to restrict the mined material to the center of the moving belt in order to prevent spillage from the side edges of the moving conveyor belt. The restriction plate will generally have a somewhat narrow longitudinally extending central opening dimensioned to freely pass the mined material. However, sometimes the central opening in the restriction plate will become blocked by an oversized piece of rock, coal or mine shaft support timber which will cause the mined material to back-up behind the obstruction or jam, eventually causing the coal to spill onto the mine floor. Furthermore, the weight of the obstructed coal on the belt may exceed several tons leading to eventual stoppage of the conveyor system, and possible damage to the conveyor drive motors and belts. Once the coal pile has formed, it must be tediously removed by hand and the conveyor system restarted. During this period of time, the mining operation is shut down since the coal cannot be moved away from the working face.

Various methods have been suggested for overcoming this problem. One such method, which is widely practiced in conventional mining operations, is to station a worker at or near the junction of the two conveying belts to manually remove obstructions or jams as they form. Alternatively, the worker may be required to monitor several junctions in order to watch for coal jams. This method is obviously unsatisfactory since the greater portion of the workman's time is spent in unproductive labor, and in fact, a jam may build so rapidly that the damage may be done before being noticed by the worker.

Another suggestion which has been practiced is to station an automatic sensor at or near the junction of the conveyor belts which will automatically shut down the belts when the coal pile caused by a jam or obstruction reaches a predetermined size. While this method serves to protect the conveyor motors and belts, the pile must still be manually removed, which often requires diverting valuable manpower and equipment from the actual mining operation.

The present invention is directed to apparatus for automatically sensing when a backup or jam has occurred due to an obstruction on the conveyor system, and automatically removing the obstruction before the coal has had an opportunity to accumulate to any great extent.

In a preferred embodiment, the obstruction clearing apparatus of the present invention is designed to be located at the junction of two flexible continuous conveyor belts of indefinite length which are angularly disposed with each other, usually at a right angle. One of the belts will often be mounted at a lower vertical elevation from the upper belt, and will include a pair of horizontally spaced longitudinally extending generally horizontally disposed plate-like restriction members positioned to form an elongated opening between facing edges of the restriction members in spaced overlying relationship with the belt. The opening generally will have a transverse dimension less than the width of the belt to restrict mined material to the central portion of the belt.

Sensing means in the form of an elongated pivotally mounted sensing member is positioned above the restriction plate and is attached to a switch which provides a contact closure when the build-up of mined material on the belt reches a predetermined height to cause movement of the sensing member.

Means are also provided responsive to the sensing means for removing the obstruction to clear the build-up. In the preferred embodiment illustrated, the removing means comprises a reciprocating ram which operates in a generally horizontal direction in the opening between the restriction plates so as to push the obstruction onto the moving belt, or off of the moving belt, depending upon the way in which the reciprocating ram is oriented with respect to the belt.

The controlling mechanism associated with the ram operates to produce a single reciprocating movement of the ram for each obstruction sensed by the sensing means, or in the event that the build-up is not entirely cleared between ram operations. The ram means of the present invention includes a longitudinally extending camming surface associated with the ram, a follower member in contact with the camming surface, a reversing switch operable by the follower, an electric drive motor for moving the ram in a generally horizontal direction through a chain drive, and means responsive to the reversing switch for causing the drive means to reverse the direction of ram travel when the follower member reaches a predetermined point along the camming surface. The ram is driven by an endless chain which permits the overall height of the apparatus to be significantly reduced for operation in low clearance mine shafts.

Further features of the invention will become apparent from the detailed description which follows.

BRIEF DESCRIPTION OF THE DRAWING

FIG. 2 is a fragmentary, partially schematic, side elevation view of the obstruction clearing apparatus of the present invention with the sensing element in an activated and unactivated position.

FIG. 3 is a fragmentary, side perspective view of the ram associated with the obstruction clearing apparatus of the present invention with the ram in the fully retracted position.

FIG. 4 is a fragmentary side elevation view of the ram of the obstruction clearing apparatus of the present invention with the ram in the partially extended position.

FIG. 5 is a side perspective view of the ram of the obstruction clearing apparatus of the present invention with the ram in the fully extended position.

FIG. 6 is a side perspective view of the ram of the obstruction clearing apparatus of the present invention with the ram in the partially retracted position.

FIG. 7 is an electrical schematic diagram of the obstruction clearing apparatus of the present invention.

DETAILED DESCRIPTION

Figure 1:
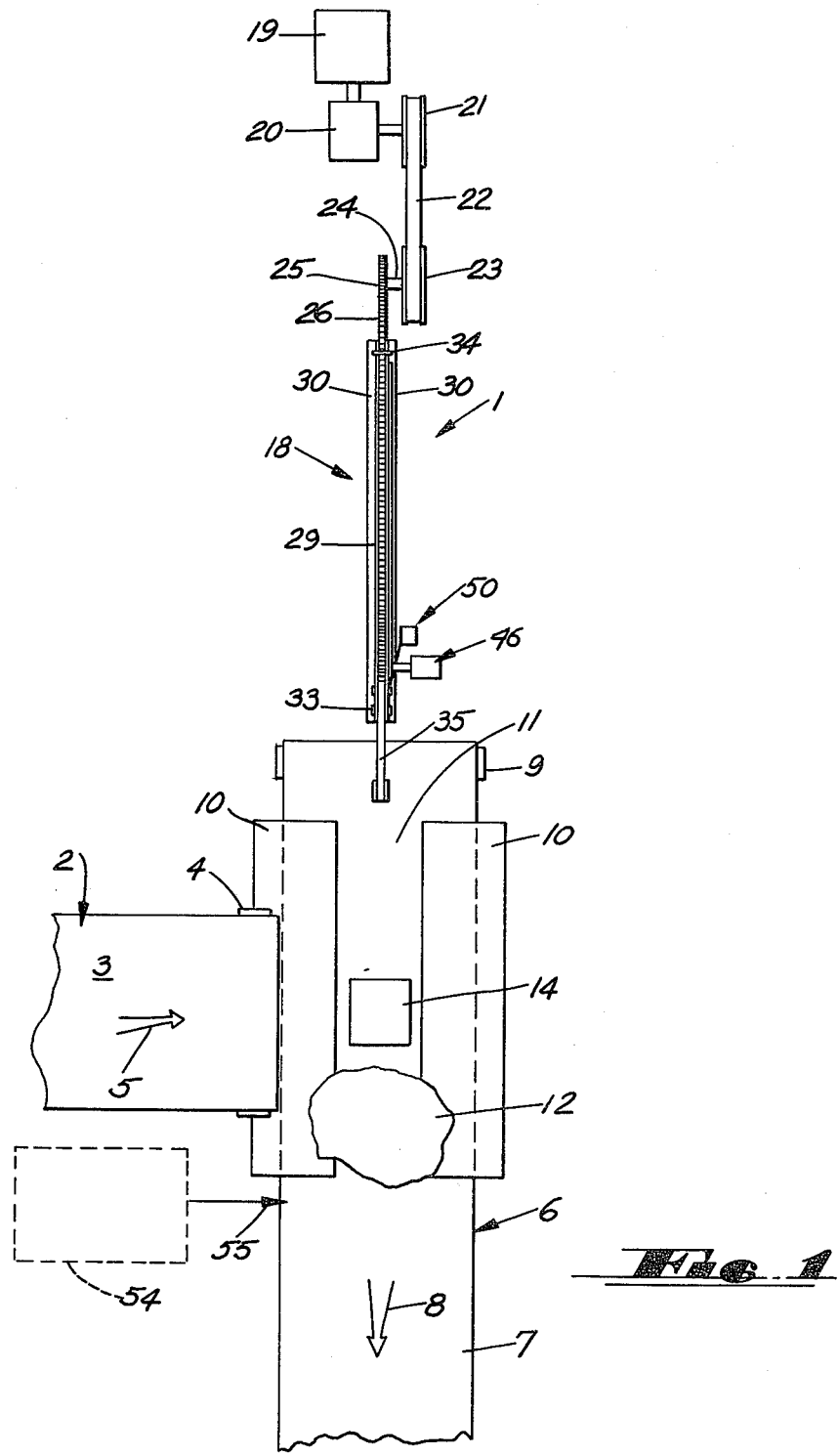
FIG. 1 is a fragmentary, partially schematic, top plan view of the obstruction clearing apparatus of the present invention in combination with a mining conveyor.

A top plan view of the obstruction clearing of the apparatus of the present invention is illustrated generally at 1 in FIG. 1. As noted above, the obstruction clearing apparatus is specifically designed to be placed at the point of intersection of two conveyors forming a conveyor system used to convey mined material within a coal mine or the like.

As illustrated in FIG. 1, the conveyor system is made up of a first conveyor 2 formed by a flexible continuous endless conveyor belt 3 which passes around a rotatably mounted roller 4 to convey mined material in the direction of arrow 5 as is well known in the art. Conveyor belt 3 may be operated for continuous movement by means not shown.

A second conveyor 6 comprising an endless conveyor belt 7 driven in the direction of arrow 8 by means not shown is placed perpendicularly to and at a vertical position slightly below first conveyor 2 so that mined material may pass from the first conveyor to the second conveyor. A rotatably mounted roller 9 similar in construction and operation to roller 4 supports the terminal end of conveyor 6. In order to restrict the mined material to the center of the second conveyor 6, a pair of restriction plates 10 are spaced longitudinally along and overlying belt 7, and are spaced so as to provide a central opening 11 permitting the mined material dumped thereon to be restricted to the central portions of the moving second conveyor belt. This construction is conventional, and well understood in the art.

As illustrated in FIG. 1 and FIG. 2, occasionally the central opening 11 of the restriction plates 10 will become blocked by an oversized piece of rock 12 or other obstruction, which will cause the mined material being dumped onto the upper surface of endless belt 7 to form a conicle-shaped pile 13 behind the obstruction, eventually causing the coal to spill onto the mine floor. Since the weight of the obstructed coal on the belt may exceed several tons, the excessive weight will eventually cause stoppage of the conveyor system, and possible damage to the conveyor drive motors and belts. As noted hereinbove, the obstruction clearing apparatus 1 of the present invention automatically senses when a backup or jam has occurred due to an obstruction on the conveyor system and automatically removes the obstruction before the coal has had an opportunity to accumulate to any great extent.

In the preferred embodiment illustrated, the obstruction clearing apparatus 1 includes sensing means 14 in the form of an elongated vertically depending rod-like sensing member 15 which is positioned above restriction plates 10 and pivotally mounted as at 16 to a switch 17 which provides a contact closure when the build-up of mined material on belt 7 reaches a predetermined height to cause movement of sensing member 15. For example, as illustrated in FIG. 2, when the height of the conicle-shaped coal pile 13 formed behind obstruction 12 reaches a predetermined height, the lower end of the sensing member 15 contacting the outer surface of the pile will move to the right about pivot point 16, causing the switch contacts of switch 17 to close. It will be understood that such sensing switches are well known in the art, and are often referred to as gob switches.

Means are also provided responsive to sensing means 14 for removing the obstruction 12 to clear the build-up. In the preferred embodiment illustrated, the removing means comprises a linearly operable reciprocating ram, shown generally at 18, which operates in a generally horizontal direction in opening 11 between restriction plates 10 so as to push the obstruction 12 onto moving belt 7.

Ram means 18 is operated by a reversible electric motor 19 which is connected to a suitable gear reducer 20 which rotatably drives a sheave 21. Sheave 21 is connected mechanically by means of a suitable drive belt 22 to a second rotatably mounted sheave 23. Sheave 23 is non-rotatably connected through a connecting shaft 24 to a spur gear 25. It will be observed that the relative sizes of sheaves 21 and 23, and spur gear 25, as well as the gear reduction ratio of gear reducer 20, will be chosen to provide an appropriate ram speed and moving force for pushing the obstruction 12 from the conveyor as will be explained in more detail hereinafter.

Spur gear 25 drives an endless loop shaped drive chain 26, the opposite end of which passes around a rotatably mounted fixed spur gear 27 as at 28.

Ram means 18 also includes a linearly operable reciprocating ram member 29 formed by a pair of longitudinally extending elongated angle-shaped side members 30. Each of side members 30 comprises a vertically extending web portion 31 and a horizontally extending flange portion 32, directed outwardly from the lower end of web portion 31. Web portions 31 of adjacent side members 30 are positioned in spaced parallel relationship, and are connected together by means of spacing pins 33 located near the forward and rearward ends.

The upper portion of drive chain 26 passes between web portions 31 of adjacent side members 30, and is fixedly attached thereto by means of a connecting pin 34 extending between the web portions 31 near the rearmost end of ram member 29. As a result of this construction, it will be observed that ram member 29 will move in a linearly forward or rearward direction, depending upon the direction of travel of drive chain 26 as determined by the direction of rotation of electric motor 19. It will be further understood that side members 30 may be slidably supported by any convenient means (not shown) to insure that the ram travels in a linear fashion as it reciprocates.

The forward end of ram member 29 terminates in a forwardly extending horizontally disposed extension member 35 of a substantially rectangular cross section. As shown in the preferred embodiment, the rear end of extension member 35 passes between adjacent flange portions 32 of the side members, and may be fixedly held in place by spacing pins 33. The forward end of extension member 35 is of a downwardly and rearwardly curving arcuate shape, as at 36.

A downwardly depending bar-like arm 37 is pivotally attached to the forwardmost end of extension member 35 as at 38. As illustrated in FIG. 3, for example, arm 37 is formed by a pair of spaced rectangular-shaped plates 38 which are pivotally secured to the outer major surfaces of extension member 35 and depend downwardly therefrom. An elongated bar-like member 39 having a planar upper end 39a is fixedly secured between the lower ends of plates 38 so as to be pivotable therewith.

It will be observed that this construction restrains pivotal movement of bar-like member 39 when the ram is moving in a forward direction to push the obstruction 12 from the conveyor belt. However, when the direction of travel is reversed as will be described in more detail hereinafter, bar-like member 39 may pivot in a clockwise direction as illustrated in FIG. 2 to prevent the bar-like arm 37 from dragging material off of the surface of the conveyor belt. It will be understood that other types of construction which accomplish this same result may also be used, if desired.

Ram member 29 also includes an elongated camming surface, indicated generally at 40, which extends longitudinally along the outer surface of one of flange portions 32. Camming surface 40 includes an elongated central portion 41 which extends longitudinally in a horizontal direction, with the face of the surface 41 being oriented substantially perpendicularly. As illustrated in FIG. 3, for example, surface 41 is spaced outwardly from the outer surface of flange portion 32.

The forward end of surface portion 41 terminates in an inwardly and forwardly extending ramp-like surface 42 to provide a smooth transition to a second ramp-like surface 43 extending between the inner surfaces of web portion 41 and flange portion 32.

The rearmost end of camming surface 40 includes an upwardly and forwardly extending ramp-like surface 44 which terminates at its forward end in a forwardly extending generally horizontal upper surface 45 extending along the upper edge of surface portion 41. The forwardmost end of upper surface portion 45 is configured to provide a smooth transition onto ramp-like surface 42. It will be understood that camming surface 40 may be formed as an integral part of ram member 29, or may be attached thereto as a separate part.

The ram means of the present invention also includes a reversing switch shown generally at 46 spaced outwardly from camming surface 40. Switch 46 includes an inwardly extending rod-like follower member 47 having an inner end configured to slidingly abut camming surface 40. Reversing switch 46 is connected electrically as will be described in more detail hereinafter to reverse the polarity of the voltage applied to motor 19 in order to provide reversal of the motor at the proper point of ram travel.

The outer lower corner of reversing switch 46 is hinged as at 48 to provide pivotal movement. The forward lower edge of the switch is urged in a downward direction by restraining spring 49.

A second switch illustrated generally at 50 is positioned alongside of ram 29, and is spaced slightly thereabove. Switch 50 is connected electrically as illustrated in FIG. 7 and operates to supply operating voltage through reversing switch 46 to motor 19 after the ram member 29 has commenced its movement. Switch 50 is actuated by means of a forwardly extending rod-like arm 51 which has a forward end configured to slidingly abut camming surface 40. It will be observed, as best shown in FIG. 3, that when the ram member is in the fully retracted position, the forwardmost end of switch arm 51 is moved completely out of engagement with camming surface 40.

The operation of the obstruction clearing apparatus 1 of the present invention will now be described. The apparatus is normally at rest in the fully retracted position as illustrated in FIG. 3. It will be observed that the innermost end of follower 47 engages the lower edge of ramp-like surface 43 to maintain reversing switch 46 in the position illustrated in FIG. 7. This position of the reversing switch will supply voltage from a voltage source V to motor 19 with such a polarity as to cause the motor to extend the ram. It will also be observed from FIG. 3 that the forwardmost end of switch arm 51 is out of engagement with camming surface 40, and in fact overlies the forward end of ramp-like surface 43.

When an obstruction 12 such as the rock illustrated in FIG. 1 and FIG. 2 causes a conical-shaped pile of coal to build-up behind the obstruction, sensing member 15 is displaced to the position shown in dashed lines in FIG. 2, thereby closing switch 17. This causes voltage V to be applied through reversing switch 46 to motor 19. Motor torque is then transmitted through gear reducer 20, sheave 21, drive belt 22, sheave 23 and spur gear 25 to cause the drive chain 26 to push ram member 29 in a forward direction as illustrated by directional arrow 52 in FIG. 4, which illustrates an intermediate position of forward ram travel. It will be observed that during forward travel, the forward end of follower 47 slides along transition ramp 42, and subsequently along central surface portion 41. The downward force exerted by restraining spring 49 causes follower 47 to be urged against the upper edge of flange portion 42. The follower member is also pushed into reversing switch 46 to hold the switch in the position illustrated in FIG. 7. At the same time, the forwardmost end of switch arm 51 slides along camming surface portions 43, 42 and 41, respectively, causing switch arm 51 to pivot outwardly, thereby closing switch 50 and permitting the supply voltage V to be supplied through reversing switch 46 to motor 19. It will be observed that the second switch 50 permits the obstruction clearing apparatus 1 to complete its sequence of operations, even if the obstruction and resulting build-up are cleared, causing switch 17 to open. It will also be understood that while ram member 29 is moving in the direction of arrow 52, arm 37 will engage the obstruction, thereby pushing it in a direction so as to clear the build-up.

FIG. 5 illustrates the condition of the obstruction clearing apparatus when the ram has reached its point of furthest forward travel or extension. It will be observed that the forwardmost end of switch arm 51 is still in contact with the outer surface of camming member 40 in order to hold switch 40 in the closed position. At the same time, follower 47 is permitted to move inwardly toward web portion 31, thus allowing the stationary contacts 46a and 46b to be connected to contacts 46c and 46d, respectively, in order to reverse the polarity of the voltage supplied to motor 19. This causes drive chain 26 to be drawn in the opposite direction, thereby pulling ram member 29 in the direction of arrow 53.

The ram member is illustrated in an intermediate rearwardly moving position in FIG. 6. The innermost end of the inwardly extended follower 47 slidingly engages ramp-like surface 44 permitting the follower 47 to slide along the upper surface portion 45 as the ram is withdrawn. It will be observed that the switch 46 is permitted to pivot about hinge 48 in order that the follower 47 may slidingly engage the upper surface portion 45. At the same time, however, the follower 47 is urged against surface 45 by restraining spring 49. In addition, switc arm 51 continues to engage camming surface 40 in order to maintain second switch 50 in the closed position. It will be observed that the contacts of reversing switch 46 will remain in their alternate position to provide rearward motion of the ram member 29 in the direction of arrow 53 while the operation illustrated in FIG. 6 continues.

As ram member 29 approaches the fully retracted position, the innermost end of follower 47 slides downwardly along the forwardmost ramp-like surface 43 so as to return switch 46 to the position illustrated in FIG. 3. When this occurs, follower 47 is pushed outwardly to again reverse the switch contacts of switch 46 and apply a voltage polarity to motor 19 so as to cause the ram member to be driven in a forward direction. At the same time, however, the forwardmost end of switch arm 51 moves off of the forward end of camming surface 40 in order to open switch 50, and thereby inhibit voltage to the motor. If switch 17 is also opened, indicating that the coal pile 13 has been depleated, the operation of the obstruction clearing apparatus 1 will cease. However, if the pile still exists, resulting in closure of switch 17, the sequence of operations described hereinabove will be repeated. As a result, the obstruction clearing apparatus normally undergoes a single reciprocating movement for each obstruction sensed by the sensing means. However, if the obstruction continues to result in a build-up, the ram will continue to operate until the build-up has dissipated.

It will be understood that various changes in the details, materials, steps and arrangements of parts, which have been herein described and illustrated in order to explain the nature of the invention, may be made by those skilled in the art within the principle and scope of the invention as expressed in the appended claims. While for purposes of an exemplary showing, the obstruction clearing apparatus 1 has been described as operating in a direction parallel to second conveyor 6, it will be understood that the apparatus may be located as depicted by dashed lines 54 in order to operate the ram member 29 in a direction transverse to second conveyor 6 in the direction of arrow 55. It will be further understood that the obstruction clearing apparatus 1 may be located alongside of first conveyor 2, or may be located above or beneath the second conveyor, as conditions warrant. In any event, it will be understood that the present invention may be utilized to push the obstruction 12 onto the moving belt, or off of the conveyor system entirely.

The embodiments of the invention in which an exclusive property or privilege is claimed are as follows:

1. A conveyor system comprising a receiving conveyor, feed means positioned above said conveyor for feeding material onto said conveyor, means for restricting the fed material to the central portion of said conveyor, sensing means to sense a build up of material cause by an obstruction on said restriction means, and means responsive to said sensing means for removing the obstruction from said restriction means.

2. The conveyor system according to claim 1 wherein said sensing means comprises means vertically spaced above said conveyor for sensing when the build-up of material reaches a predetermined height.

3. The conveyor system according to claim 2 wherein said sensing means comprises an elongated sensing member oriented in a generally vertical direction and switch means connected to said member providing a switch contact closure when the build-up of material on the conveyor causes movement of said member.

4. The conveyor system according to claim 3 including means for pivotally mounting said member, said contact closure occurring when the lower part of said member is moved in a sideways direction.

5. The conveyor system according to claim 1 wherein said removing means comprises ram means operable for reciprocating movement to push the obstruction in a direction to clear the build-up.

6. The conveyor system according to claim 5 wherein said ram means includes an extensible elongated ram operable for reciprocating movement in a generally horizontal direction.

7. The conveyor system according to claim 6 including means for mounting said ram means so that said ram is operable to push said obstruction in a direction generally parallel to the direction of material travel on said conveyor.

8. The conveyor system according to claim 6 including means for mounting said ram means so that said ram is operable to push the obstruction in a direction generally transverse to the direction of material travel on said conveyor.

9. The conveyor system according to claim 6 wherein said feed means comprises a first continuous conveyor belt of indefinite length for conveying material and said conveyor comprises a second continuous conveyor belt of indefinite length angularly disposed with respect to said first belt for receiving material therefrom, said ram being positioned at the junction of said first and second belts.

10. The conveyor system according to claim 9 including means for mounting said ram means so that said ram operates in a direction generally parallel to said second belt.

11. The conveyor system according to claim 10 including a generally cylindrical roller forming the end of the feed means, said second belt being wrapped partially about said roller to reverse the direction of belt travel, said ram means being positioned in spaced relationship with said feed means end.

12. The conveyor system according to claim 10 wherein said restriction means includes a pair of horizontally spaced longitudinally extending generally horizontally disposed plate-like restriction members positioned to form an elongated opening between facing edges of said restriction members in spaced overlying relationship with said second belt, said opening having a transverse dimension less than the width of the second belt to restrict material to the central portion of the second belt, said ram reciprocating within said opening.

13. The conveyor system according to claim 6 including means for producing a single reciprocating movement of said ram for each obstruction sensed by said sensing means.

14. The conveyor system according to claim 6 including means for causing reciprocating movement of said ram for as long as the obstruction is present.

15. The conveyor system according to claim 6 wherein said ram means includes a longitudinally extending camming surface associated with said ram, a follower member in contact with said camming surface, a reversing switch operable by said follower, drive means for moving said ram in a generally horizontal direction, and means responsive to said reversing switch for causing said drive means to reverse the direction of ram travel when said follower member reaches a predetermined point along said camming surface.

16. The conveyor system according to claim 15 wherein said ram means includes a camming surface comprising a first generally vertical surface extending longitudinally along the outer surface of said ram, a second generally horizontal surface positioned above and intersecting said first surface, said second surface extending along said first surface, a forwardly and upwardly extending rear ramp-like surface joining said first and second surfaces near the point of furthest ram extension and an upwardly and inwardly extending front ramp-like surface joining said first and second surfaces near the point of furthest ram retraction, said follower being positioned to slidingly abut said front, first, rear and second surfaces, in the order named, as said ram is extended and then retracted, said follower being moved outwardly as it slides along said first surface to cause ram movement in a forward direction and being moved inwardly to cause ram movement in a rearward direction as it slides along said second surface.

17. The conveyor system according to claim 16 wherein said reversing switch is pivotally mounted and includes spring means for forcing said switch in a downward direction to urge said follower against said second surface.

18. The conveyor system according to claim 15 wherein said ram means includes means for urging said follower member into sliding abutting contact with said camming surface, said camming surface including a first surface extending longitudinally along the ram for causing said follower member to move inwardly as it slides therealong to cause the reversing switch and drive means to operate the ram in a direction toward the obstruction, a second surface adjacent said first surface and beginning at the point of furthest ram extension which permits the follower member to move outwardly as it slides therealong to cause the reversing switch and drive means to operate the ram in a direction away from the obstruction, and a transition surface between said first and second surfaces at the point of furthest ram retraction permitting said follower member to pass from said second to said first surface.

19. The conveyor system according to claim 15 including a second switch and a rod-like member for operating said second switch, said rod-like member being positioned against said camming surface to enable said drive means after said ram has extended a predetermined distance, said rod-like member being positioned out of engagement with said camming surface when said ram has returned to its furthest retracted position to disable said drive means if said sensing means no longer detects a material build-up.

20. The conveyor system according to claim 6 including an arm depending downwardly from the forwardmost end of said ram for contacting the obstruction, and means for attaching said arm to said ram, said attaching means preventing pivotal movement between said arm and said ram as the ram is extended to push the obstacle from the belt, said attaching means permitting pivotal movement between said arm and said ram as the ram is retracted to prevent drawing material from the conveyor.

21. The conveyor system according to claim 1 wherein said sensing means comprises means vertically spaced above said conveyor for sensing when the build-up of material reaches a predetermined height, said sensing means including an elongated sensing member oriented in a generally vertical position and switch means connected to said member for providing a switch contact closure when the build-up of material on the conveyor causes movement of said member, said member being pivotally mounted so that said contact closure occurs when the lower part of said member is moved in a sideways direction, said removing means comprising ram means operable for reciprocating movement to push the obstruction in a direction to clear the build-up, said ram means including an extensible elongated ram operable for reciprocating movement in a generally horizontal direction, said conveyor means comprising a first continuous feed belt of indefinite length for conveying material and said conveyor comprising a second continuous conveyor belt of indefinite length angularly disposed with respect to said first belt for receiving material therefrom, said ram means being mounted at the junction of said first and second belts so that said ram is operable to push the obstruction from said second belt, said sensing means being positioned above said second belt.

22. The conveyor system according to claim 21 including means for causing reciprocating movement of the ram for as long as the obstacle is present, said ram means including a longitudinally extending camming surface associated with the ram, a follower member in contact with said camming surface, a reversing switch operable by said follower, drive means for moving said ram in a generally horizontal direction, and means responsive to said reversing switch for causing said drive means to reverse the direction of ram travel when said follower member reaches a predetermined point along said camming surface, said camming surface comprising a first generally vertical surface extending longitudinally along the outer surface of the ram, a second generally horizontal surface positioned above and intersecting said first surface, said second surface extending along said first surface, a forwardly and upwardly extending rear ramp-like surface joining said first and second surfaces near the point of furthest ram extension and an upwardly and inwardly extending front ramp-like surface joining said first and second surfaces near the point of furthest ram retraction, said follower being positioned to slidingly abut said front, first, rear and second surfaces, in the order named, as said ram is extended and then retracted, said follower being moved outwardly as it slides along said first surface to cause ram movement in a forward direction and being moved inwardly to cause ram movement in a rearward direction as it slides along said second surface, said reversing switch being pivotally mounted and including spring means for urging said switch in a downward direction to urge said follower against said second surface.

23. The conveyor system according to claim 22 including a second switch and a rod-like member for operating said second switch, said rod-like member being positioned against said camming surface to enable said drive means after said ram has extended a predetermined distance, said rod-like member being positioned out of engagement with said camming surface when said ram has returned to its furthest retracted position to disable said drive means if said sensing means no longer detects a material build-up.

24. The conveyor system according to claim 23 wherein said restriction means include a pair of horizontally spaced longitudinally extending generally horizontally disposed plate-like restriction members positioned to form an elongated opening between facing edges of the restriction members in spaced overlying relationship with said second belt, said opening having a transverse dimension less than the width of the second belt to restrict material to the central portion of the second belt, said ram reciprocating within said opening.

* * * * *